US006615908B1

(12) United States Patent
Bosher et al.

(10) Patent No.: US 6,615,908 B1
(45) Date of Patent: Sep. 9, 2003

(54) METHOD OF TRANSPORTING OR STORING PERISHABLE PRODUCE

(75) Inventors: Paul Raymond Bosher, Auckland (NZ); Robert Barnes, Tauranga (NZ)

(73) Assignee: Transphere Systems Limited, Auckland (NZ)

( * ) Notice: Subject to any disclaimer, the term of this patent is extended or adjusted under 35 U.S.C. 154(b) by 0 days.

(21) Appl. No.: 09/624,343

(22) Filed: Jul. 24, 2000

Related U.S. Application Data

(62) Division of application No. 08/693,329, filed as application No. PCT/NZ95/00017 on Feb. 17, 1995, now abandoned.

(30) Foreign Application Priority Data

Feb. 17, 1994 (NZ) ................................................. 250904

(51) Int. Cl.[7] .............................. A23B 7/04; A23B 4/06; F25B 29/00; F25D 17/04
(52) U.S. Cl. ..................... 165/48.1; 165/263; 165/61; 165/64; 62/239; 62/274; 62/405; 62/406; 62/417; 62/78; 62/96; 62/440; 426/418; 426/419; 426/263; 426/312; 99/474; 99/476
(58) Field of Search .................. 165/48.1, 64, 222, 165/263, 61; 62/239, 274, 291, 406, 405, 417, 78, 240, 186, 96, 440, 237, 62; 426/419, 263, 312; 99/474, 476

(56) References Cited

U.S. PATENT DOCUMENTS

| 2,079,304 A | 5/1937 | Polderman |
| 2,549,547 A | 4/1951 | Trask |
| 3,349,574 A | 10/1967 | Glaser |
| 3,412,571 A | 11/1968 | Bolynn |
| 3,620,765 A | 11/1971 | McDonnell |
| 4,055,931 A | 11/1977 | Myers |
| 4,066,401 A | 1/1978 | Solomon |
| 4,411,918 A | 10/1983 | Cimino et al. |
| 4,467,612 A | 8/1984 | Weasel, Jr. |

(List continued on next page.)

FOREIGN PATENT DOCUMENTS

| AU | 68359/87 | 7/1987 |
| DE | 3810655 | 1/1990 |
| DE | 4218026 | 12/1993 |
| EP | 0 254 947 | 2/1988 |
| FR | 2701095 | 8/1994 |
| GB | 835409 | 5/1960 |
| GB | 2070218 | 9/1981 |
| GB | 2 234 664 | 2/1991 |
| JP | 59-151878 | 8/1984 |
| JP | 1-189473 | 7/1989 |
| JP | 3-85281 | 4/1991 |
| WO | WO 88/10222 | 12/1988 |
| WO | WO 94/10849 | 5/1994 |

*Primary Examiner*—John K. Ford
(74) *Attorney, Agent, or Firm*—Young & Thompson (57) ABSTRACT

The invention allows cool rooms or sea containers designed for frozen goods to handle produce requiring more precisely controlled temperatures and conditions, e.g., vegetables and fruits requiring temperatures in the chilling range and often also needing control or modification of the atmosphere. Each load of produce (100) (e.g. of pallet size) is held in the sea container or cool room but is sealed from the air of the refrigerated environment by, for example, a plastics bag (56). The atmosphere within the bag is then circulated by a fan (12) (or by convection currents from a heating element) so as to pass through the load and around it via ducts (30) provided adjacent the bag (56). Heat exchange (50) between the circulating gas and the refrigerated environment, via the plastics film, serves to cool the load. However, if cooling is excessive a heating element can be used to raise the temperature of the circulating atmosphere. Gas composition of the atmosphere can be controlled by scrubbing, flushing, etc. via pipes from a central unit or at each load individually or by choosing semi-permeable plastic for the sealing bags.

10 Claims, 9 Drawing Sheets

U.S. PATENT DOCUMENTS

| | | |
|---|---|---|
| 4,764,389 A | 8/1988 | LaBarge |
| 4,779,524 A | 10/1988 | Wade |
| 4,824,685 A | 4/1989 | Bianco |
| 4,845,958 A | 7/1989 | Senda et al. |
| 5,028,443 A | 7/1991 | Wade |
| 5,063,753 A * | 11/1991 | Woodruff .................... 62/239 |
| 5,228,313 A | 7/1993 | Okamoto et al. |
| 5,319,941 A | 6/1994 | Schilling |
| 5,419,153 A | 5/1995 | Hartley |
| 5,438,917 A | 8/1995 | Bolkestein et al. |
| 5,441,098 A | 8/1995 | Kristensen |
| 5,460,841 A | 10/1995 | Herdeman |
| 5,507,157 A | 4/1996 | Mase et al. |
| 5,531,158 A | 7/1996 | Peryyman, Jr. |
| 5,561,986 A | 10/1996 | Goodall |
| 5,778,557 A | 7/1998 | Leavens |
| 5,791,150 A | 8/1998 | Bosher et al. |

* cited by examiner

METHOD OF TRANSPORTING OR STORING PERISHABLE PRODUCE

CROSS-REFERENCE TO RELATED APPLICATIONS

This application is a division of application Ser. No. 08/693,329, filed Oct. 8, 1996, now abandoned which was the 35 USC 371 national phase of International application PCT/NZ95/00017 filed on Feb. 17, 1995, which designated the United States.

TECHNICAL FIELD

The present invention relates to improvements in and/or relating to a method of transporting (or readying for transport) or (ready for storing) storing perishable produce it also relates to apparatus, containers and palletized loads

BACKGROUND ART

Perishable produce is transported by road, sea, rail and air using a variety of different techniques. With high value perishable produce it has been usual to rely not only upon refrigeration but also or instead the use of a controlled atmosphere that best suits the preservation of the produce.

By controlled atmosphere is meant any infusion, scrubbing or the like of a sealed or controllable atmosphere about the produce and usually involves the control of one or more of the gases: nitrogen, oxygen, carbon dioxide and ethylene.

By perishable produce is meant any produce the value of which can be maintained or enhanced by slowing senescence (ageing) thereof while being stored, readied for transport and/or being transported. The produce can be a respiring comestible such as a Suit or vegetable, a non-respiring produce such as meat or fish as well as any mixture or combination of produce made using any of the foregoing with or without other additives. Perishable produce could include within its ambit live fish, shell fish of any form, crustaceans in any form etc.

Perishable produce could also include flowers, drugs, body organs or other items requiring a controlled temperature.

Transportable container could include pallet based transportable items such as plastics wrapped stacks of produce or cartons of produce.

A feature of current technology is the trend towards the use of refrigerator containers of standard sizes capable of being handled by container handling equipment onto and off of trucks, railway trucks, ships, etc. The present invention however recognizes the possibility of some advantage over customizing such containers to provide some enhanced control insofar as the atmosphere and/or temperature is concerned which if desired can lend itself to the use of existing refrigerated shipping, cool stores, refrigerated transportation containers or the like thus reducing the level of commitment that might be required to capital expenditure.

It is therefore an object of the present invention to provide a method of storing, transporting or readying for transport of perishable produce including apparatus applicable thereto which will at least provide the public with a useful choice.

Examples of the prior art include U.S. Pat. No. 5,125,237. This relates to a solid sided insulated pallet sized container which incorporates spaces for forklift, it includes fans for air circulation. However, this system utilizes solid CO2 for cooling, it does not utilize heat transfer across the walls of the container to possibly cool the interior. No form of sealing the container is disclosed.

U.S. Pat. No. 3,633,381 discloses an open cycle portable refrigerator which uses a compress gas cooling system. It provides a insulated box and the air is circulated by convection means and not forced. There is no use of heat transfer across the walls of the container to provide for maintenance or alteration of the internal temperature.

DISCLOSURE OF INVENTION

In a first aspect the present invention consists in a method of transporting, storing (or readying for transport or storing) perishable produce which comprises;
  (i) loading and sealing the produce into a sealable transportable container or onto a pallet (hereinafter "container") to substantially isolate gas associated with said produce from the surrounding environment, said container or pallet having
    means electrically energizable or otherwise actuable and powered to circulate said gas associated with said produce amongst the produce and in some heat exchange relationship with or through at least part of a sealing periphery of said sealed produce and its associated gas; and
  (ii) holding the temperature of the sealed produce/gas environment or lowering the temperature of and then holding the temperature of the sealed produce/gas environment at a refrigerating temperature by ensuring a controlled refrigerating environment outside of said container which is in a heat exchange relationship with said at least part of a sealing periphery and hence said said produce/gas environment,while the gas within said container being continuously or continually circulated therein.

Preferably said container is transported, if needed, while within said controlled refrigerating environment.

Preferably said method also utilizes means to control the atmosphere or to provide a displacing gas for the purpose of controlling the gas environment within said transportable container.

Preferably control of said gas environment involves the control of at least one or more of the nitrogen, oxygen, carbon dioxide and ethylene content of the gas environment within the container.

Preferably there is provided means to maintain the humidity of said gas environment.

Preferably there is provided means to control the humidity of said gas environment.

Preferably said means to control the humidity of said gas environment utilizes a water trap to collect some or all condensation within the transportable container in a tray.

Preferably heating means is provided to substantially heat said collected condensation so as to raise the humidity within said transportable container.

Preferably said controlled refrigerating environment is that of a refrigerated shipping container, such as, is currently used for refrigerated cargoes.

Preferably said transportable container includes means internally thereof to raise (preferably under temperature sensor control) the temperature of the circulating gas environment therein (e.g. an electrical heater) to a desired temperature or temperature range above the temperature of said controlled refrigerating environment.

Preferably said means electrical energizable within the container is a fan.

Preferably the locus of urged circulation of the gas environment is up the walls of the container, over the top of produce stack back down the walls of the container.

Alternatively and preferably if said produce is fruit, vegetables or similar the locus of urged circulation is up the walls of said container across and through the produce at various levels and back down the walls of the container.

Preferably said container is formed with an outer skin of a conductive material and the gas environment is ducted downwardly by fan means through at least one or a number of chambers or ducts defined against, within or between panels forming part of the container to thereafter issue upwardly from below any produce loaded therein (preferably up through a raised floor).

Preferably said containers are formed of a metal such as aluminum and preferably said containers are formed largely with a double skin spaced apart.

Alternatively said containers are formed by placing a plastics bag over said product, said bag then being braced so as to provide air gaps or ducts around said produce.

Preferably said container carries a controlled atmosphere generating and controlling unit.

Preferably that unit is electrically energizable and preferably includes a compressor.

Preferably the compressor is in a direct heat exchange relationship with the refrigerated environment rather than the interior of the transportable container.

Preferably in other forms of the present invention a controlled atmosphere can be ducted into the container from some centralized controlled atmosphere generating unit not itself carried by the transportable container.

Alternatively each said container may carry its own controlled atmosphere generating unit.

Preferably said container includes heat sensors and means to sense the gas environment and the container has means responsive thereto for the control of the temperature therewithin and the atmosphere therein.

Alternatively a centralized control system is possible whereby said container includes heat sensors and means to sense the gas environment and a central unit has means responsive thereto for the control of the temperature therewithin and the atmosphere therein.

Preferably in the event of a failure of the refrigeration system and/or the atmosphere controlling means, there is provided means whereby controlled quantities of ambient air can enter the sealed transportable container.

Preferably said ambient air enters via the opening of an air inlet.

In a further aspect the present invention consists in a method of transporting, storing, readying for transporting or storing within the at least partly controlled refrigerated environment within a refrigerated container, chamber or hold, produce requiring less refrigeration than the temperature(s), or no lower than the temperature(s), of the refrigerated environment, wherein assemblages of the produce are each sealed within a transportable container having a gas environment in circulation therewithin and having that gas environment through a wall at least of the transportable container in a heat losing relationship with the refrigerated environment, the individual said transportable containers each having gas environment and/or produce temperature sensing means and gas environment temperature raising means individually responsive to the temperature sensing means should the temperature be below or drop below a predetermined level, the overall arrangement being such that if desired individual refrigerating temperatures above that of the refrigerated environment can be provided for the individual transportable containers.

Preferably said container is transported, if needed, while within said controlled refrigerating environment.

Preferably said method also utilizes means to control the atmosphere or to provide a displacing gas for the purpose of controlling the gas environment within said transportable container.

Preferably control of said gas environment involves the control of at least one or more of the nitrogen, oxygen, carbon dioxide and ethylene content of the gas environment within the container.

Preferably there is provided means to maintain the humidity of said gas environment.

Preferably there is provided means to control the humidity of said gas environment.

Preferably said means to control the humidity of said gas environment utilizes a water trap to collect some or all condensation within the transportable container in a tray.

Preferably heating means is provided to substantially heat said collected condensation so as to raise the humidity within said transportable container.

Preferably said controlled refrigerating environment is that of a refrigerated shipping container, such as, is currently used for refrigerated cargoes.

Preferably said transportable container includes means internally thereof to raise (preferably under temperature sensor control) the temperature of the circulating gas environment therein (e.g. an electrical heater) to a desired temperature or temperature range above the temperature of said controlled refrigerating environment.

Preferably said means electrical energizable within the container is a fan.

Preferably the locus of urged circulation of the gas environment is up the walls of the container, over the top of produce stack back down the walls of the container.

Alternatively and preferably if said produce is flit, vegetables or similar the locus of urged circulation is up the walls of said container across and through the produce at various levels and back down the walls of the container.

Preferably said container is formed with an outer skin of a conductive material and the gas environment is ducted downwardly by fan means through at least one or a number of chambers or ducts defined against, within or between panels forming part of the container to thereafter issue upwardly from below any produce loaded therein (preferably up through a raised floor).

Preferably said containers are formed of a metal such as aluminum and preferably said containers are formed largely with a double skin spaced apart.

Alternatively said containers are formed by placing a plastics bag over said product said bag then being braced so as to provide air gaps or ducts around said produce.

Preferably said container carries a controlled atmosphere generating and controlling unit.

Preferably that unit is electrically energizable and preferably includes a compressor.

Preferably the compressor is in a direct heat exchange relationship with the refrigerated environment rather than the interior of the transportable container.

Preferably in other forms of the present invention a controlled atmosphere can be ducted into the container from some centralized controlled atmosphere generating unit not itself carried by the transportable container.

Alternatively each said container may carry its own controlled atmosphere generating unit.

Preferably said container includes heat sensors and means to sense the gas environment and the container has means responsive thereto for the control of the temperature therewithin and the atmosphere therein.

Alternatively a centralized control system is possible whereby said container includes heat sensors and means to sense the gas environment and a central unit has means responsive thereto for the control of the temperature therewithin and the atmosphere therein.

Preferably in the event of a failure of the refrigeration system and/or the atmosphere controlling means, there is provided means whereby controlled quantities of ambient air can enter the sealed transportable container.

Preferably said ambient air enters via the opening of an air inlet.

In a further aspect the present invention consists in a method of transporting, storing or readying for transport within in an, at least, partly controlled refrigerated environment within a refrigerator container, chamber, structure or hold, produce requiring less refrigeration than the temperature(s), or not lower than the temperature(s), of the refrigerated environment wherein assemblages of the produce are each sealed within a transportable container having a gas environment in circulation therewithin and having that gas environment through at least part of a wall at least of the transportable container in a heat losing relationship within the refrigerated environment, the individual said transportable containers each having at least produce or gas environment temperature sensing means and gas environment temperature raising means individually responsive to the temperature sensing means such that, in use, should the temperature be below or fall below a predetermined level, the gas environment temperature raising means may raise the temperature within each individual transportable container to the temperature desired above that of the refrigerated environment.

Preferably, each transportable container, or at least one of the transportable containers, includes a controlled atmosphere gas environment therein (preferably as herein described).

In still a further aspect the present invention consists in a sealable transportable container suitable for use in any method in accordance with the present invention.

In yet a further aspect the present invention consists in a transportable container suitable for use in a method in accordance with the present invention comprising:

means providing a box form having a closable and sealable opening thereto to allow the loading and unloading of produce thereinto;

at least a partial inner wall defining a ducting space against the outer panel of at least one of the sides of the box form down which the gas environment can be passed;

means electrically energizable at an upper position within the box form to draw a gas environment therewithin upwardly through any produce stacked on the bottom of the box form or some raised floor or skeletal floor thereof and to direct the gas environment downwardly through said ducting space so as to be in a heat exchange (preferably in use losing) relationship with any refrigerated environment outside of the box forms;

an electrically operable atmosphere control unit responsive to the atmosphere within the box form capable of controlling at least one of the gases nitrogen, oxygen, carbon dioxide and ethylene in said atmosphere; and electrically energizable heating means disposed in the locus of the in use gas movement under the action of said means electrically energizable capable of raising the temperature of that circulating gas environment should the temperature within the transportable box form drop below a predetermined or preset minimum.

Preferably said box form is rectanguloid or cuboid.

Preferably said at least a partial inner wall is defined by the produce or cartons of produce.

Preferably a layer of insulating material is provided in association with said sealing means, said insulating material preferably been sized to ensure that the internal temperature of said transportable container is suitable.

Preferably said electrically operable atmosphere control unit is directly associated with each said transportable container.

Alternatively wherein said electrically operable atmosphere control unit is remote from said transportable container.

Preferably said means electrically energizable or otherwise forcing to circulate the gas environment is housed within an upper part of said time when in use.

Preferably said means electrically energizable or otherwise forcing is a fan preferably variable speed.

Preferably said sealing means comprising a plastics bag or similar sheeting.

Preferably said plastics bag is at least gas semi-permeable with respect to certain gases, for example, ethylene.

Preferably said forklift carriable pallet is of a standard type.

In yet a further aspect, the present invention consists in a transportable container suitable for use in a method in accordance with the present invention comprising:

means providing a box form having a closeable and sealable opening thereto to allow the loading and unloading of produce thereinto;

at least a partial inner wall defining a ducting space outside the outer panel of at least one of the sides of the box form through which the gas environment can be passed;

means to allow the circulation of a gas environment therewithin through any produce stacked on the bottom of the box form or some raised floor or skeletal floor thereof and through said ducting space so as to be in the heat exchange (preferably, in use, losing) relationship with any refrigerated environment outside of the box forms, whether the circulation be by circulation means or by convection;

electrically energizable heating means disposed in the locus of the in use gas movement capable of raising the temperature of that circulating gas environment should the temperature within the transportable box form drop below a predetermined or preset minimum.

Preferably said apparatus is substantially as hereinafter defined with or without reference to specific embodiments.

Preferably said at least a partial inner wall is defined by the produce or cartons of produce.

Preferably a layer of insulating material is provided in association with said sealing means, said insulating material preferably been sized to ensure that the internal temperature of said transportable container is suitable.

Preferably said electrically operable atmosphere control unit is directly associated with each said transportable container.

Alternatively wherein said electrically operable atmosphere control unit is remote from said transportable container.

Preferably said means electrically energizable or otherwise forcing to circulate the gas environment is housed within an upper part of said time when in use.

Preferably said means electrically energizable or otherwise forcing is a fan preferably variable speed.

Preferably said sealing means comprising a plastics bag or similar sheeting.

Preferably said plastics bag is at least gas semi-permiable with respect to certain gases, for example, ethylene.

Preferably said forklift carriable pallet is of a standard type.

In yet a further aspect, the present invention consists in a transportable container suitable for use in a method in accordance with the present invention comprising:

- means providing a box form having a closeable and sealable opening thereto to allow the loading and unloading of produce thereinto;
- at least a partial inner wall defining a ducting space outside the outer panel of at least one of the sides of the box form through which the gas environment can be passed;
- means to allow the circulation of a gas environment therewithin through any produce stacked on the bottom of the box form or some raised floor or skeletal floor thereof and through said ducting space so as to be in the heat exchange (preferably, in use, losing) relationship with any refrigerated environment outside of the box forms, whether the circulation be by circulation means or by convection;
- electrically energizable heating means disposed in the locus of the in use gas movement capable of raising the temperature of that circulating gas environment should the temperature within the transportable box form drop below a predetermined or preset minimum.

Preferably said at least a partial inner wall is defined by the produce or cartons of produce.

Preferably a layer of insulating material is provided in association with said sealing means, said insulating material preferably been sized to ensure that the internal temperature of said transportable container is suitable.

Preferably said electrically operable atmosphere control unit is directly associated with each said transportable container.

Alternatively wherein said electrically operable atmosphere control unit is remote from said transportable container.

Preferably said means electrically energizable or otherwise forcing to circulate the gas environment is housed within an upper part of said time when in use.

Preferably said means electrically energizable or otherwise forcing is a fan preferably variable speed.

Preferably said sealing means comprising a plastics bag or similar sheeting.

Preferably said plastics bag is at least gas semi-permiable with respect to certain gases, for example, ethylene.

Preferably said forklift carriable pallet is of a standard type.

Preferably said apparatus is substantially as hereinafter defined with or without reference to specific embodiments.

In yet another aspect the present invention consists in a transportable item comprising:

- a forklift carriable pallet;
- sealing means;
- produce, said produce being sealed within said sealing means and on said pallet;
- said container having associated therewith means electrically energizable or otherwise forcing to circulate the gas environment within said transportable container when said sealing means is substantially sealed;
- the temperature of the environment within said container being capable of being effected by heat exchange from said circulating gas environment through at least part of at least one wall of said transportable container;
- means to control the temperature within said transportable container such that said temperature is held or lowered and then held.

Preferably said at least a partial inner wall is defined by the produce or cartons of produce.

Preferably a layer of insulating material is provided in association with said sealing means, said insulating material preferably been sized to ensure that the internal temperature of said transportable container is suitable.

Preferably said electrically operable atmosphere control unit is directly associated with each said transportable container.

Alternatively wherein said electrically operable atmosphere control unit is remote from said transportable container.

Preferably said means electrically energizable or otherwise forcing to circulate the gas environment is housed within an upper part of said time when in use.

Preferably said means electrically energizable or otherwise forcing is a fan preferably variable speed.

Preferably said sealing means comprising a plastics bag or similar sheeting.

Preferably said plastics bag is at least gas semi-permiable with respect to certain gases, for example, ethylene.

Preferably said forklift carriable pallet is of a standard type.

The invention consists in the foregoing and also envisages constructions of which the following gives examples.

BRIEF DESCRIPTION OF INVENTION

Preferred forms of the present invention will now be described with reference to the accompanying drawings in which;

FIG. 3 is a perspective view showing as a transparent item a refrigerated sea container 101 having positioned therewithin as in FIG. 2 two transportable containers 100 in accordance with the present invention, there being shown the refrigeration unit of the sea container at the left hand end, rollers carried by the transportable containers and/or the sea container to facilitate loading and avoid excessive movement during transit, there being shown the movement of the refrigerated air of the sea container 101 by the arrows, and showing at the right hand end of the right hand transportable container an access opening into the transportable container 100 which preferably seals without reliance upon a sealing curtain as well as the carried control unit(s) and atmosphere control system of the transportable container;

BEST MODES FOR CARRYING OUR INVENTION

While in the preferred form, specific embodiments are depicted, obviously the scope of the invention is as previously defined.

The present invention realizes the difficulty that the provision of built refrigerated sea containers pose if a controlled atmosphere system is to be utilized in conjunction with the normal refrigeration of such sea containers. These difficulties arise because: i) it is generally difficult to control the cargo temperature accurately enough within such refrigerated sea containers for fresh perishable produce since many of the existing stock of refrigerated sea containers are designed to transport frozen rather than chilled produce; ii) existing refrigerated sea containers are not generally able to create or maintain the desired normal high level of humidity which is required for the majority of perishable produce; iii) gas and/or air circulation in such existing stock of refrigerated sea containers is normally below the standard required for adequate maintenance of perishable produce; iv) the existing stock of refrigerated sea containers are not generally sufficiently gas tight for the purpose and tend to allow the atmosphere to leak at a generally unmanageable rate.

To manufacture a purpose built refrigerated sea container that would overcome the aforementioned difficulties would be expensive and renders obsolete much of the existing stock of refrigerated transportation containers. The present invention, therefore, has applicability to existing refrigerated ships, coolrooms as well as existing refrigerated transportation containers.

Figure 1:
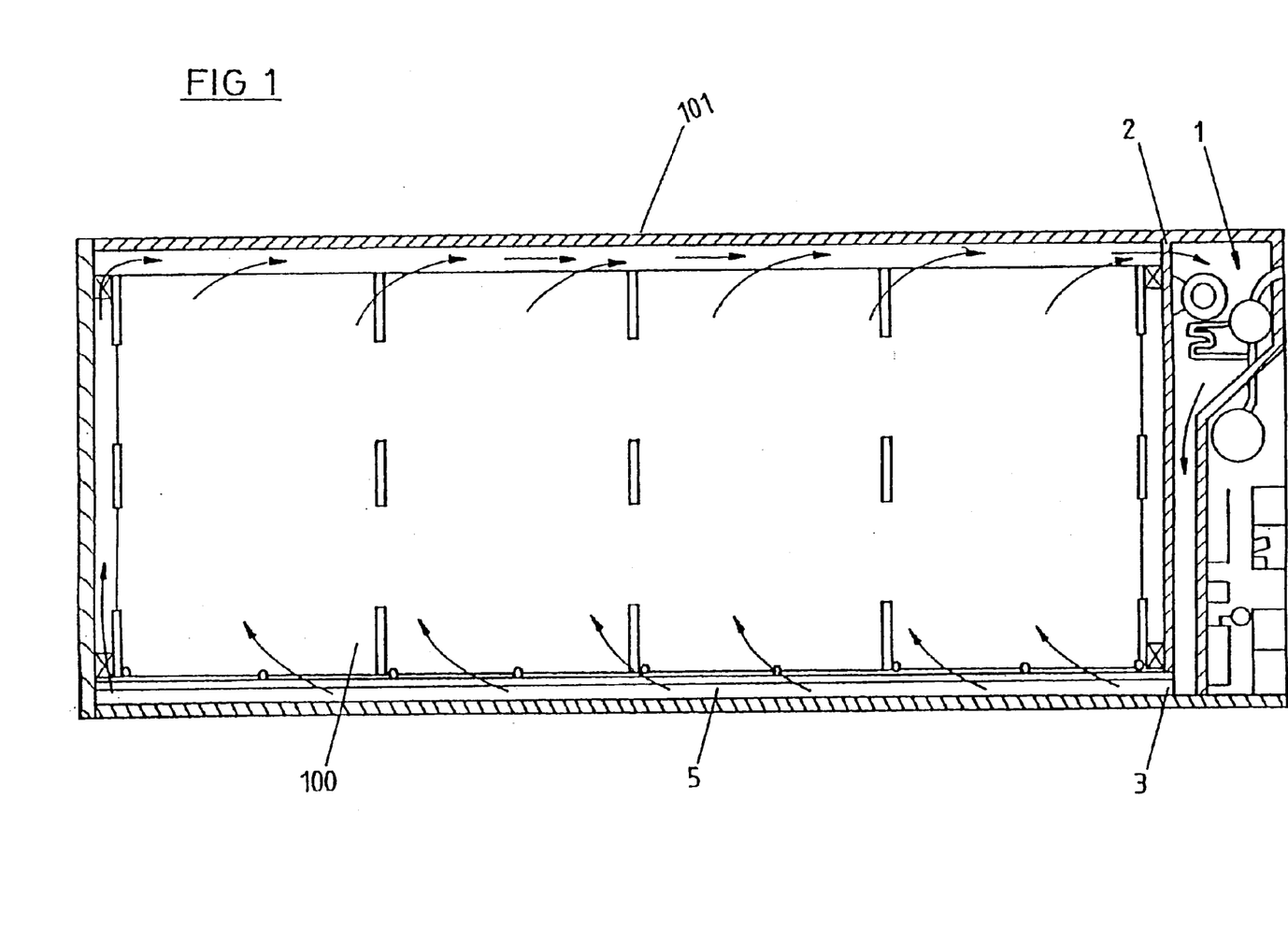
FIG. 1 shows a conventional 40 foot refrigerated sea container 101 with a transportable container 100 in accordance with the present invention positioned internally thereof so as to take advantage of the refrigerated environment thereof the arrows showing how there is provision below, about and above the transportable container within the refrigerated sea container for the air of the refrigerated environment to be ducted from and back to a standard refrigerated sea container refrigeration unit.

FIG. 1 shows a circulation of air around the transportable container 100 which is contained within a forty foot refrigerated sea container 101. The air flows up the sides and over the top of the transportable container and is drawn into the sea container's refrigeration unit labelled 1. The refrigeration unit cools the air and pumps it back down under the transportable container. The warm air is drawn in through the inlet 2 and the cooled air emerges through the outlet labelled 3.

Figure 2:
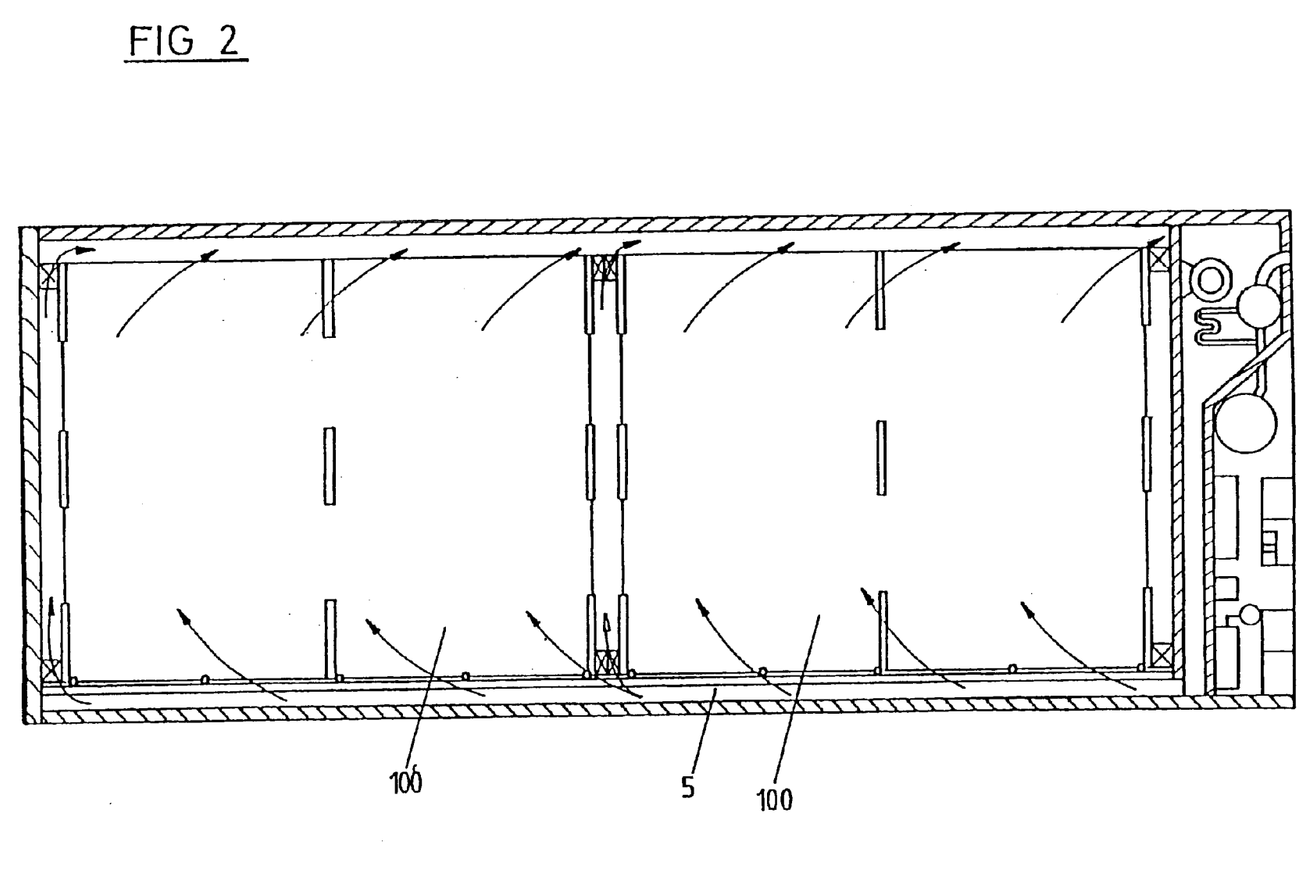
FIG. 2 shows a similar arrangement as shown in FIG. 1 but showing this time two transportable containers 100 in accordance with the present invention positioned therewithin, it being possible in some embodiments of the present invention to provide the gas environment (whatever it might be) within each transportable container 100 in the refrigerated sea container 101 with a temperature at or above the air temperature about the transportable containers.

Referring to FIG. 2, the situation is similar, however, the forty foot refrigerated sea container 101 contains two transportable containers 100 internally. Again, the air flows up the sides and over the top of the transportable containers and it is drawn into the sea container's refrigeration unit through inlet 2 and the cooled air is driven out the outlet labelled 3.

Figure 3:
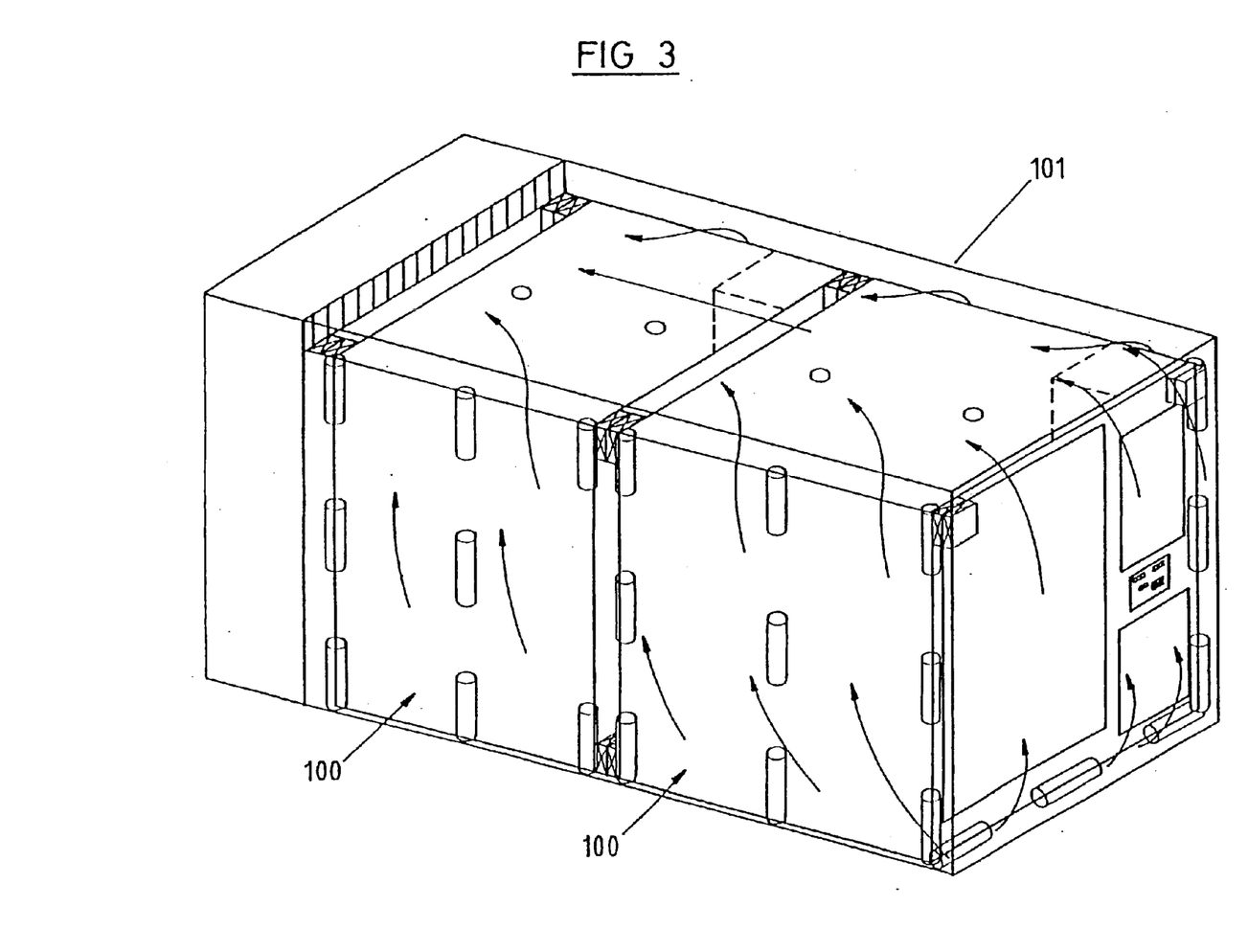

Referring to FIG. 3, the air circulation pattern is shown around the six sides of the internal transportable containers. The air flows through the ducts which are provided by the gap or space between the inside walls of the sea container and the outside walls of the internal transportable container.

Figure 4:
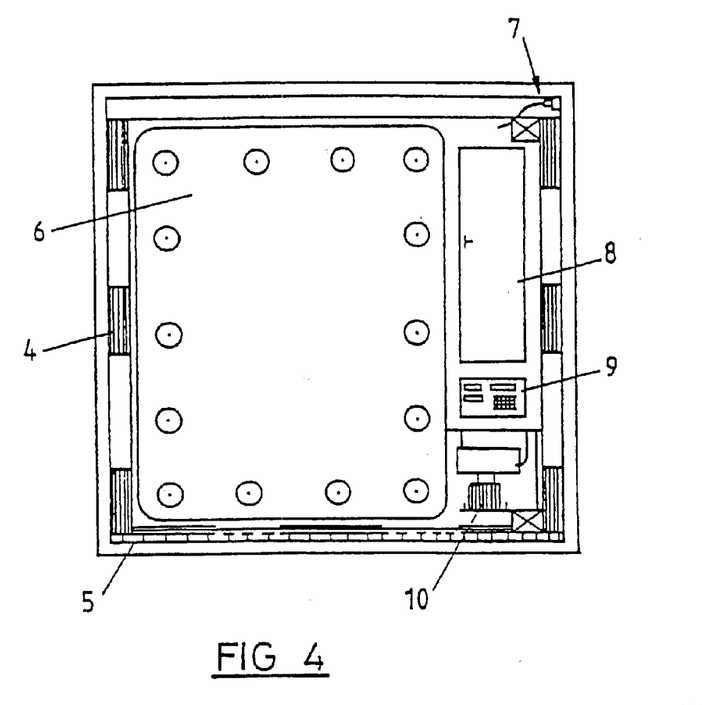
FIG. 4 is an end view of a transportable container 100 in accordance with the present invention positioned within a sea container as in FIG. 3.

Referring to FIG. 4, an end view of the transportable container positioned inside the sea container is shown. The transportable container 100 is shown with rollers 5 which provide the gap between the internal wall of the sea container and the external wall of the transportable container. The transportable container has a door 6 which enables produce to be placed inside the transportable container, this door is shown closed in the Figure.

The control system 7 of the transportable container is shown in the Figure to the right of the door.

A dry ice bunker 8, which is preferably insulated, is shown. In another preferred embodiment of the invention this bunker is a cavity for gas pressure cylinders.

The computer panel for monitoring of gas and/or temperature levels and/or the changing of set gas and/or temperature levels is shown 9. A compressor, which is preferably of the oilless type is shown below the computer panel labelled 10.

Figure 5:
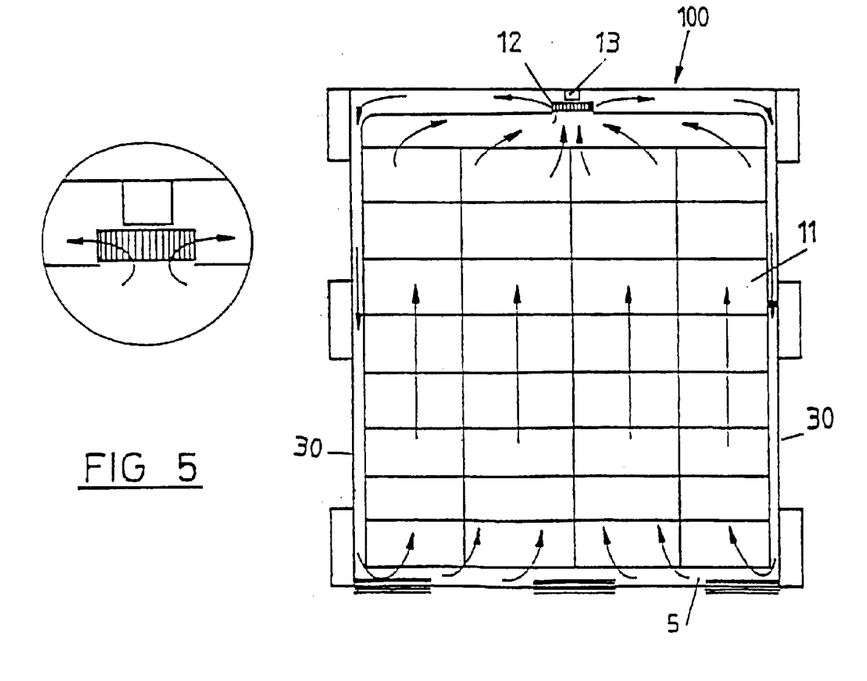
FIG. 5 is a cross section of a transportable container 100 in accordance to a preferred form of the present invention showing the gas circulation therewithin under the action of preferably a single or a series of centrifugal fans positioned at the top of the box form of the transportable container and showing the ducting of that gas environment downwardly through ducts making a heat exchange contact with the outer skin of the transportable container 100 before infusing upwardly through the floor or a raised floor through the produce (whether cartoned, shelved, basketed or the like)

Referring to FIG. 5, air is drawn up the sides and through the stacked cartons of produce or produce itself 11 through the air gaps 30 around the sides and in the base and top of the cartons. The air is drawn up by a fan 12 and the air passes a temperature probe 13 which monitors inside and outside temperatures. This probe is connected to the computer system.

Although in the preferred embodiment, a fan 12 is used to provide the circulation means, other circulation means could be used or, in use, convection currents set up by the heating means forming part of this invention within the transport container may provide sufficient circulation, particularly for some types of produce.

Figure 6:
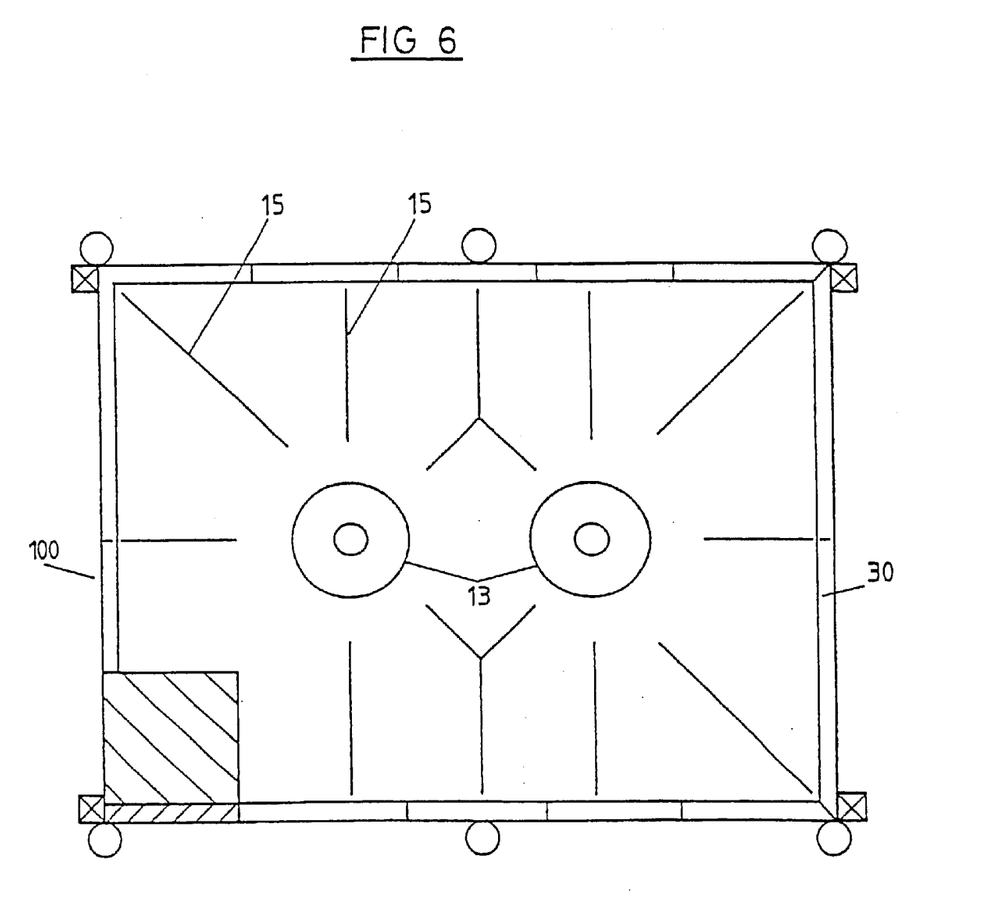
FIG. 6 is a plan view of a transportable container 100 showing a disposition of two centrifugal fans below the top skin of the box form which has been removed for the purpose of explanation.
Figure 7:
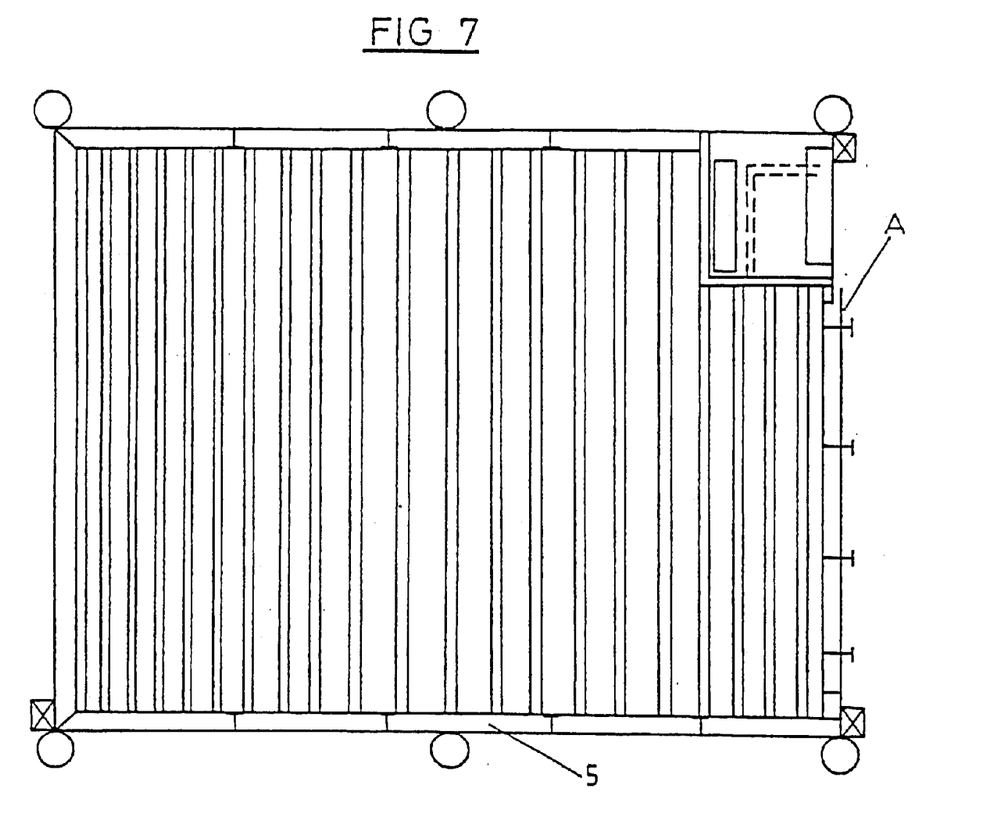
FIG. 7 is a similar view to that of FIG. 6 but this time showing a preferred floor which facilitates the infusion of downwardly ducted gas in the atmosphere of the transportable container 100 evenly upwardly through the produce stacked thereon.
Figure 7A:
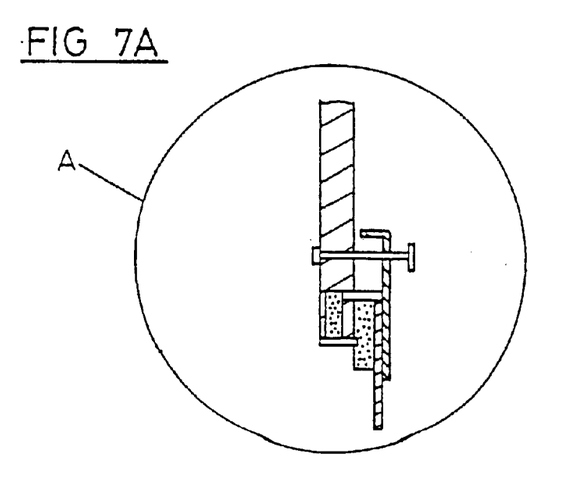
FIG. 7a shows a possible airtight seal system for the access door or opening of the container as depicted in FIG. 7.
Figure 8:
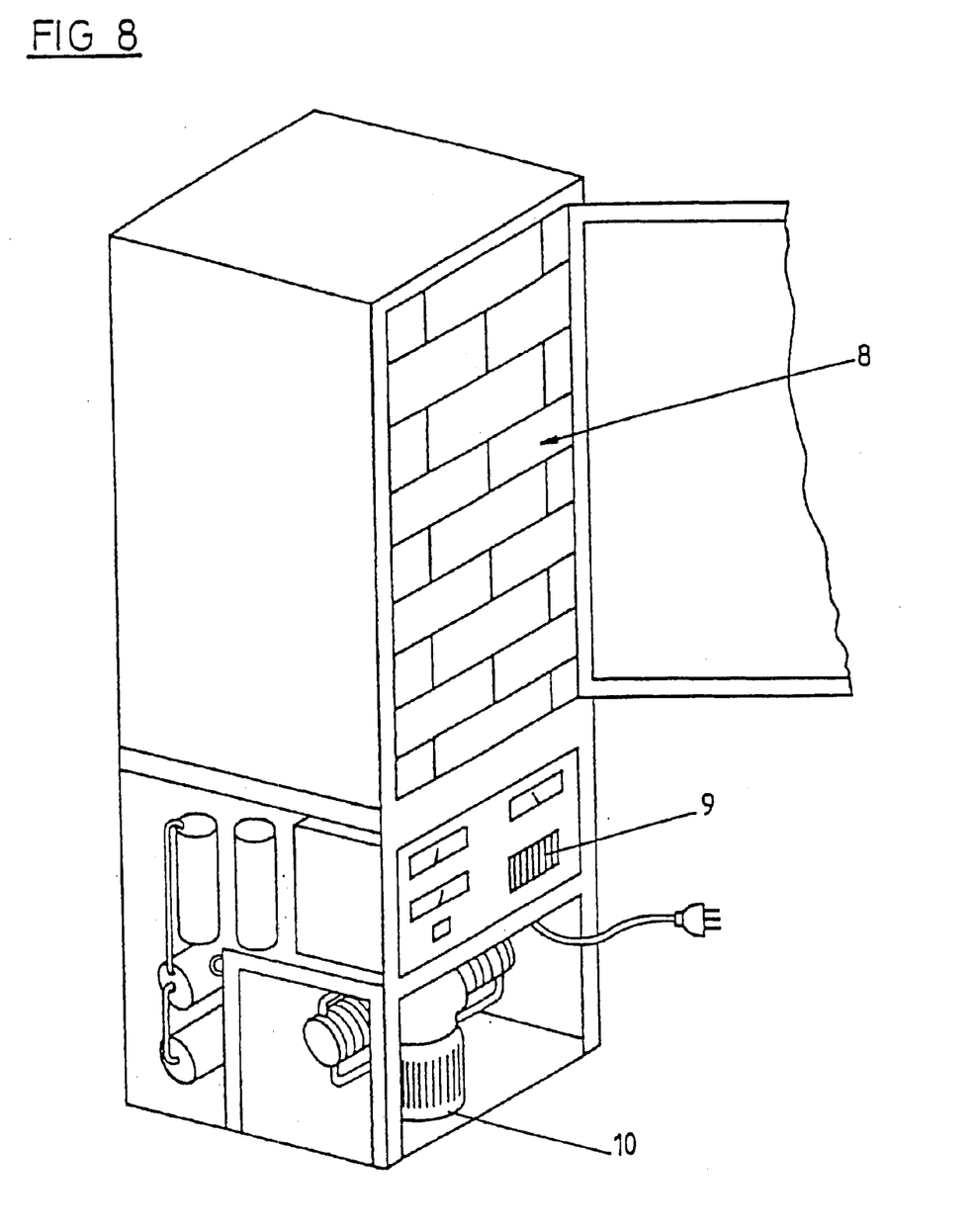
FIG. 8 is the design of one preferred form of the present invention showing how a control unit associable within the box form of a transportable container in accordance with the present invention can be provided to include an electrical connection to power all of the electrically energizable componentry to be carried with the transportable container, to locate an air or gas treating unit with an air compressor in a direct heat exchange outside of the sealed gas atmosphere of the transportable container and showing how the unit can carry a closeable storage area for a carbon dioxide source such as either dry ice or carbon dioxide cylinders.
Figure 9:
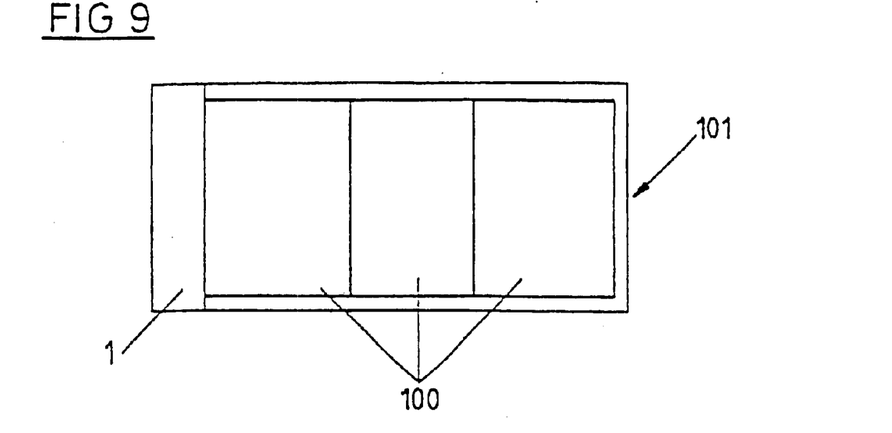
FIG. 9 shows an alternative arrangement of transportable containers 100 within a shipping container 101, in this case the transportable containers abut one another and an air gap is provided between the outer walls of transportable container and the inner walls of the shipping container.
Figure 10:
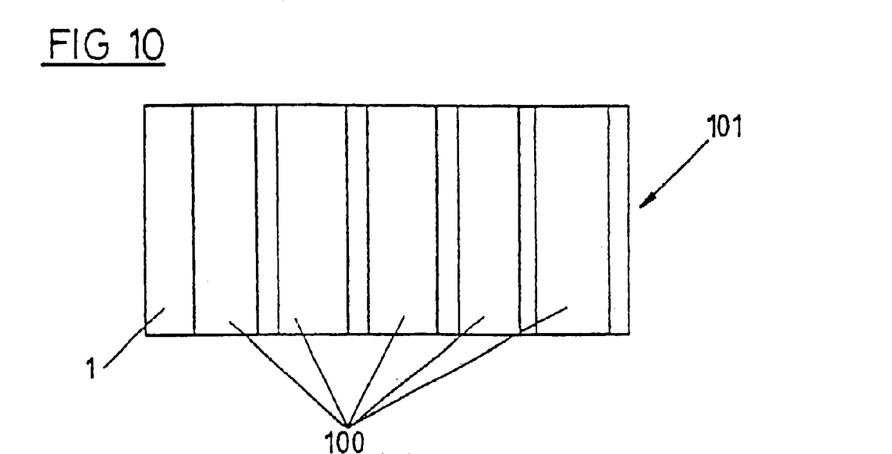
FIG. 10 shows another alternative arrangement of transportable containers within a shipping container, in this case the transportable containers substantially abut the inner walls of the shipping container and air gaps or ducts, are provided between the transportable containers or rows of containers.
Figure 11:
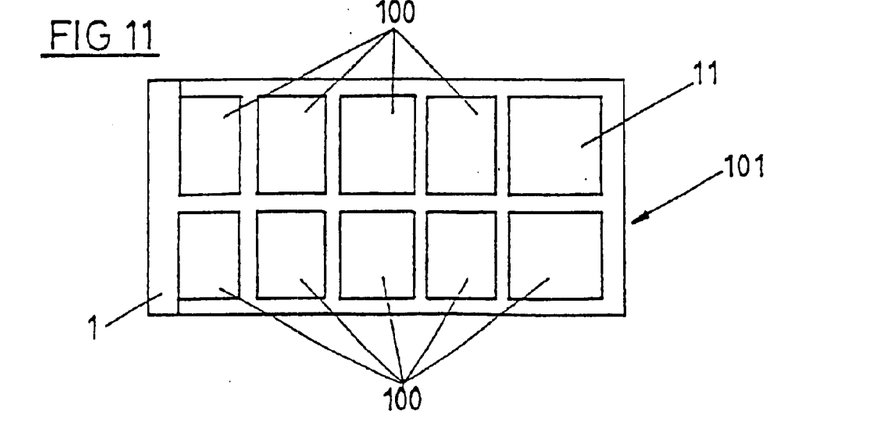
FIG. 11 shows yet another alternative arrangement of transportable containers within a shipping container wherein air gaps are provided both between the individual transportable containers and the inner walls of the shipping container.

Referring to FIG. 6, the top of the transportable container is illustrated. Shown are the variable speed fans and temperature probe 13. Shown also are the bracings for the roof 15 in between the outer and inner roof. These direct the flow of air away from the fans. The air flows down the duct 30 provided by the gap between the produce and the transportable container. This gap is maintained by "T" rail braces and/or corrugations.

In an alternative form of the invention, there are two rows of fans. An air gap is maintained between the cartons of produce and the inner side of the outer wall of the transportable container by raised "T" sections. Air is drawn up through the cargo by the fans and directed between the outer and interior roof and outer and interior walls of the transportable container. The air mixture is vented in several directions flowing in between the gap across the top of the roof, down the walls and in between the spaces in the "T" section floor. It is then drawn up again through the produce, therefore, completing one revolution of the air circulation cycle.

When the product is at the correct temperature as measured by the temperature probe 13 the fans may be slowed down which would have the effect of reducing moisture loss of the product.

In another form of the invention, the outer sides of the transportable container are not flat surfaces but have corrugated sides. This larger surface area would speed up the rate of heat transfer.

It is preferred that the transportable container's control systems are connected to the sea container's refrigeration control system. This provides the ability for the transportable container to have some control over the sea container's refrigeration system. When the sea container's refrigeration system goes into defrost normally its fans stop. The transportable container's control system would ensure that the fans would be kept running during defrost. The system would stay in defrost mode until the outer metal sides of the transportable container are raised above 0° C. At this temperature, any ice built up on the inside of the six outer metal surfaces would melt. While this process is in action, the transportable container's fans would be turned off.

It is anticipated that the transportable container 100 will be manufactured in a number of different dimensions, for example, there is significant commercial advantage in being able to transport more than one type of fresh product in one container. Two or more transportable containers 100 could fit into one sea container 101. These transportable containers 100 could contain different products kept at different temperatures.

In one form of the invention the sea container's 101 temperature is set to the lowest storage temperature of the products. The transportable container's heating mechanism is then used to keep the temperature in the transportable containers with other products at higher temperatures.

Preferably, the transportable container will draw its refrigeration from an external source. However, in certain situations it may be that some models will contain or have attached their own refrigeration equipment. In this case, an insulated cover would be placed around any or all of its metal sides.

It is preferable that the transportable container be fitted with its own controlled atmosphere generation equipment similar to that described in Transphere's U.S. Pat. No. 5,063,753 the content of which is herein incorporated by way of reference. However, this equipment could be mounted into or attached to the outside of the sea container itself.

Connecting pipes will be required to allow gas to flow between the transportable containers gas atmosphere and control system.

Although the following description relates to a preferred method wherein the gas environment is also controlled, in the case of some produce such as carrots and, particularly for brief storage or transport, there is no necessity to control the composition of the gas environment but merely the temperature. However, for longer storage or transport of produce and, in particular, produce which is more susceptible to high rates of senescence, the gas environment composition must also be controlled.

Preferably, the system will supply nitrogen, oxygen, carbon dioxide on demand and with certain products it will also supply ethylene gas on demand. Preferably, the system will also consist of a method of scrubbing carbon dioxide and/or ethylene gas from the transportable container cargo area.

There are a number of options for the atmosphere control system s. One of these is a flushing system which draws air in through a membrane and pumps it into the transportable container's cargo area under pressure. This has the effect of flushing out the atmosphere inside via pressure outlets until desired levels of oxygen and carbon dioxide are reached.

A recirculatry system recycles the cargo atmosphere through the membrane which is used to remove oxygen, carbon dioxide and ethylene. Removal of some of these gasses requires that others take their place. The membrane would either replace with enriched nitrogen gas or air or a mixture of both would be added.

Chemicals and/or plastics or other types of fibers could be used to remove oxygen and/or carbon dioxide from the atmosphere. It would require a system of controls that cycled the transportable container air mixture so that is was in contact with the chemicals or fibers.

A gas purge system could be provided whereby gas is purged into the transportable container cargo area at mixtures and levels determined by the control system.

If the oxygen level in the cargo area goes below its set point then the system will either draw in outside or process outside air through the membrane which instead of directing a nitrogen enriched stream into the cargo area may direct an oxygen enriched stream.

The proposed controlled atmosphere system may use any combination of any one, or more of the above techniques to control its cargo atmosphere.

Another possibility is the use of active films, for example there are films available which provide for the absorption of carbon dioxide or ethylene. The use of an ethylene film to seal fruit will to a certain extent slow down its ripening and thus maintain its value.

In the event that power is cut off to the transportable container the controlled atmosphere system would automatically open the air vents or inlet valves. This is required to stop the atmosphere going anaerobic or the $CO_2$ level becoming too high.

The transportable container may contain a battery back up unit to provide back up power to the transportable container.

The atmosphere in the transportable container 100 can be sealed gas tight to a level much better than if a controlled atmosphere system was fitted into the sea container without the transportable container, therefore, the requirement for large amounts of gas to compensate for high leakage is not thought to be required. This means that the transportable container controlled atmosphere system can be downsized which results in cost saving and reduced power consumption.

As air is cooled it shrinks producing a negative pressure build up inside the transportable container and as the air temperature rises the air expands producing a positive pressure build up inside the transportable container. This pressure may be controlled by a pressure sensitive device which is designed to keep the transportable container under optimum positive pressure. Preferably, the device will be connected into the transportable container and exhaust its internal atmosphere, or let external air to the transportable container's cargo area in compensation for changing environmental pressure.

In other forms of the invention, there is fitted an alarm system which will provide an alert about security breaches or certain adverse conditions, eg. a power off or oxygen level too low or too high In another form of the invention environments can be created where it is possible to grow plants in transit or better preserve them. One aid to this is an infusion of light at programmed intervals.

It is anticipated that at least two different atmosphere systems Type I and Type II will be alternatively offered as a source of gas supply to the transportable container. *Preferably one of these is fitted to a transportable container although both may be fitted to provide a backup.

Type I consists of a nitrogen generator, preferably, a hollow fiber membrane or a PSA system, a $CO_2$ supply source either dried ice or a pressure cylinder, oxygen carbon dioxide gas analyses, a PLC controller or similar computer control system, solenoid valves, flow valve, an oilless compressor and, optionally, data recorders for temperature, oxygen and carbon dioxide gasses.

An alternative system, Type II, would consist of a liquid nitrogen pressure vessel, pressure vessels containing $CO_2$, an optional dry ice system for $CO_2$ supply, oxygen and carbon dioxide gas analysers, PLC controllers or a similar computer control system and solenoid valves.

Although the majority of this description relates to the provision of transportable or portable containers, the technology described could equally be used in the provision of fixed containers for coolrooms and the like and provide an alternative to upgrading the coolroom itself and/or provide better control over temperature and gas environment for produce in the coolroom. The system also allows a variety of different temperatures and/or gas environments to be maintained in different containers within a single refrigerated coolroom.

Figure 12:
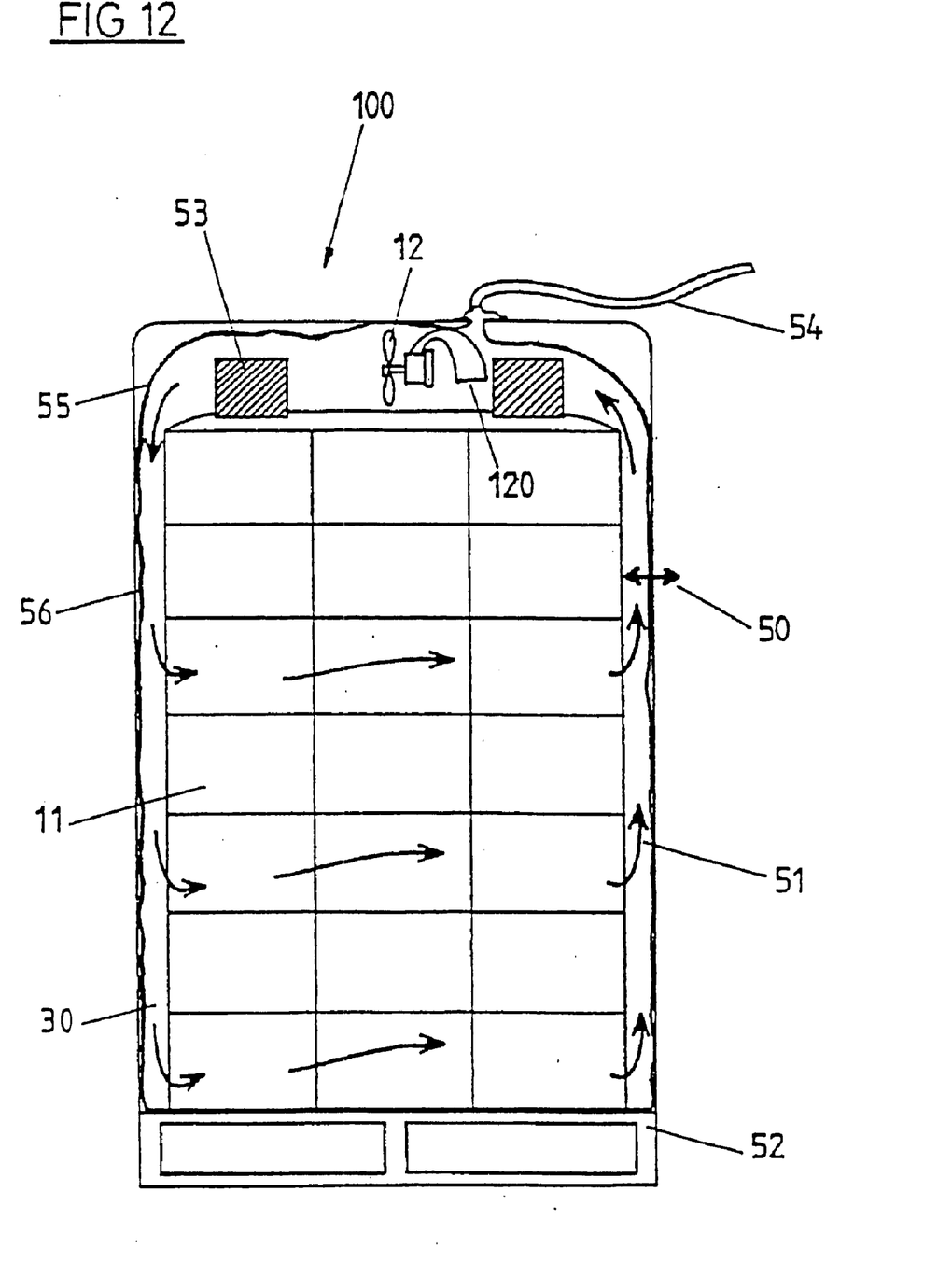
FIG. 12 shows the most preferred form of the present invention wherein a pallet is provided upon which is stacked produce, the product being fully encased in a, for example, plastics bag, a fan is provided as is a fan cap to provide for the sealing of said plastics bag, the air is circulated such that it flows down through a gap provided between the produce and the plastics bag, through said produce and up an air gap provided on the opposite side between said produce and said plastics bag. Heat exchange occurs through the walls of the plastics bag.

The most preferred form of the present invention is as illustrated in FIG. 12. A pallet 52 is provided on to which cartons 11 of produce is loaded surrounding the produce in a sealing means, preferably a plastics bag 56, the plastics bag 56 is spaced apart from the produce cartons 11 thus providing a duct 30. Present in at least fluid communication with said plastics bag 56 is an electrically energizable means to circulate the gas environment preferably a fan 12. This fan may be of variable speed type or may simply consist of a single speed fan. Surrounding said fan 12 and provided for the sealing of said bag is a fan cap 55. In forms of the invention contained within said bag 56 are atmospheric scrubbing devices or means 53. These means may consist of desiccating elements or devices or devices which absorb specific gases such as ethylene.

The flow of air 51 forced by said fan 12 is as shown in the figures, the air flows down the duct 30 provided between the plastics bag 56 and the produce 11 through the cartons of produce 11 and up the duct on the opposite side formed between the plastics bag 56 and the cartons of produce 11. A heat exchange relationship 50 exists through the side walls of the transportable container 100. Especially preferred forms of the invention a service line 54 is provided in the most basic forms of the invention, this service line may simply provide for power the fan 12, in other forms the service line may provide for monitoring and/or control of the atmosphere contained within said transportable container.

In forms of the present invention the plastics bag 56 may comprise a, for example, gas semi-permeable plastics, this plastics material may, for example, allow for the exit of ethylene but substantially prevent the exit of other gases. In other forms of the invention an insulated outer container may be provided over said plastics bag. The thickness of this insulated material may be selected so as to provide for the best internal environment, eg temperature, within said transportable container. In forms of the invention temperature raising means 120 such as a resistance heater are provided to reuse the temperature of the internal environment within the said transportable container if required.

What is claimed is:

1. A method of transporting or storing perishable produce which comprises:

providing a sealable transportable container having circulating means electrically energizable and powered to circulate gas associated with said produce amongst a produce and in some heat exchange relationship with at least part of a sealing periphery of said produce and its associated gas; and heating means disposed within the container operable to raise the temperature of the circulating gas environment therein;

said sealing periphery comprised of a flexible bag completely surrounding the produce, said circulating means, and said heating means;

loading and sealing the produce into the sealable transportable container to substantially isolate the gas associated with said produce from the surrounding environment;

lowering the temperature of the sealed produce and associated gas; and then holding the temperature of the sealed produce and associated gas at a refrigerating temperature by ensuring a controlled refrigerating environment outside of said container which is in a heat exchange relationship with said at least part of the sealing periphery and hence said sealed produce and associated gas, while the gas within said container is continuously or continually circulated therein, whereby upon operating the heating means, the refrigerating temperature is above the controlled refrigerating temperature.

2. The method of transporting or storing perishable produce as claimed in claim 1, wherein said circulating means is a fan.

3. The method of transporting or storing perishable produce as claimed in claim 1, wherein the locus of urged circulation of the associated gas is up the side of the produce, over the top of the produce, and back down the side of the produce.

4. The method of transporting or storing perishable produce as claimed in claim 1, wherein the locus of urged circulation is up the side of said produce across and through the produce at various levels, and back down the side of the produce.

5. The method of transporting or storing perishable produce as claimed in claim 1, wherein the flexible bag is a plastics bag placed over said produce, and then braced so as to provide air gaps or ducts around said produce.

6. A method of transporting or storing perishable produce which comprises:

providing a sealed pallet having circulating means electrically energizable and powered to circulate gas associated with said produce amongst a produce and in some heat exchange relationship with at least part of a sealing periphery of said produce and its associated gas; and heating means disposed within the sealed pallet operable to raise the temperature of the circulating gas environment therein;

said sealing periphery comprised of a flexible bag completely surrounding the produce, said circulating means, and said heating means;

loading and sealing the produce onto the pallet to obtain a produce stack and substantially isolate the gas associated with said produce from the surrounding environment;

lowering the temperature of the sealed produce and associated gas; and then holding the temperature of the sealed produce and associated gas at a refrigerating temperature by ensuring a controlled refrigerating environment outside of said sealed pallet which is in a heat exchange relationship with said at least part of the sealing periphery and hence said sealed produce and associated gas, while the gas within said sealed pallet is continuously or continually circulated therein, whereby upon operating the heating means, the refrigerating temperature is above the controlled refrigerating temperature.

7. The method of transporting or storing perishable produce as claimed in claim 6, wherein said circulating means electrical energizable within the sealed pallet is a fan.

8. The method of transporting or storing perishable produce as claimed in claim 6, wherein the locus of urged circulation of the associated gas is up the side of the produce stack, over the top of the produce stack, and back down the side of the produce stack.

9. The method of transporting or storing perishable produce as claimed in claim 6, wherein the locus of urged circulation is up the side of the produce stack across and through the produce stack at various levels, and back down the side of the produce stack.

10. The method of transporting or storing perishable produce as claimed in claim 6, wherein the flexible bag is a plastics bag placed over said produce, and then braced so as to provide air gaps or ducts around said produce.

* * * * *